(12) United States Patent
Parkkinen et al.

(10) Patent No.: US 9,537,943 B2
(45) Date of Patent: Jan. 3, 2017

(54) SYSTEM, METHOD, APPARATUS, AND COMPUTER PROGRAM PRODUCT FOR PROVIDING A SOCIAL NETWORK DIAGRAM IN A P2P NETWORK DEVICE

(75) Inventors: Jukka Parkkinen, Oulu (FI); Mikko A. Hyvarinen, Oulu (FI); Kari Kaarela, Oulu (FI); Kirmo Koistinen, Oulu (FI); Hannu Kauniskangas, Oulu (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1222 days.

(21) Appl. No.: 11/539,454

(22) Filed: Oct. 6, 2006

(65) Prior Publication Data

US 2008/0084875 A1    Apr. 10, 2008

(51) Int. Cl.
*H04L 29/08* (2006.01)
*H04L 12/725* (2013.01)

(52) U.S. Cl.
CPC .......... *H04L 67/104* (2013.01); *H04L 45/306* (2013.01); *H04L 67/1068* (2013.01)

(58) Field of Classification Search
CPC .... H04L 67/306; H04L 69/329; H04L 9/3247; H04L 45/12; H04L 45/122; H04L 45/20; H04L 51/32; H04L 63/102; H04L 67/104; G06Q 20/3674; G06Q 20/3825; G06Q 20/3829; G06Q 20/401; G06Q 50/01
USPC ................................................ 455/411, 403
See application file for complete search history.

(56) References Cited

U.S. PATENT DOCUMENTS

| 5,987,139 | A | * | 11/1999 | Bodin .............................. 380/44 |
| 6,175,831 | B1 | | 1/2001 | Weinreich et al. |
| 6,810,259 | B1 | * | 10/2004 | Zhang ...................... H04W 8/18 455/435.1 |
| 7,016,307 | B2 | | 3/2006 | Vasudev et al. |
| 7,069,308 | B2 | | 6/2006 | Abrams |
| 7,693,159 | B2 | * | 4/2010 | Nishimura ............ H04L 45/122 370/392 |
| 8,149,697 | B2 | * | 4/2012 | Parkkinen .............. G06Q 50/01 370/230 |

(Continued)

FOREIGN PATENT DOCUMENTS

JP    2006197288    7/2006
WO   WO 2005/107306 A1    11/2005

OTHER PUBLICATIONS

J. Antonio Garcia-Macias; *Service Discovery in Mobile Ad-Hoc Networks: Better at the Network Layer?*; IEEE Computer Society, Copyright 2005; Proceedings of the 2005 International Conference on Parallel Processing Workshops (ICPPW '05).

(Continued)

*Primary Examiner* — Matthew Sams
(74) *Attorney, Agent, or Firm* — Core Wireless Licensing Ltd.

(57) ABSTRACT

An apparatus for providing a social network diagram in a P2P network device includes a communication element and an updating element. The communication element is configured to receive an access ticket from an originating node, the access ticket for accessing content via a network. The updating element is configured to determine a true degree of separation between the originating node and the apparatus embodied as a recipient node based on a delivery route of the access ticket and past delivery routes of past access tickets.

31 Claims, 8 Drawing Sheets

(56) References Cited

U.S. PATENT DOCUMENTS

| | | | |
|---|---|---|---|
| 2002/0032860 A1* | 3/2002 | Wheeler | G06Q 20/00 713/170 |
| 2002/0194256 A1* | 12/2002 | Needham | H04L 67/104 709/201 |
| 2003/0188117 A1* | 10/2003 | Yoshino et al. | 711/164 |
| 2004/0003248 A1* | 1/2004 | Arkhipov | H04L 9/3247 713/170 |
| 2004/0095907 A1* | 5/2004 | Agee et al. | 370/334 |
| 2004/0128514 A1* | 7/2004 | Rhoads | 713/176 |
| 2004/0167984 A1* | 8/2004 | Herrmann | 709/229 |
| 2005/0021725 A1* | 1/2005 | Lobbert | H04W 48/16 709/223 |
| 2005/0120214 A1* | 6/2005 | Yeates et al. | 713/171 |
| 2005/0201290 A1* | 9/2005 | Vasudev | H04L 45/12 370/238 |
| 2005/0235062 A1 | 10/2005 | Lunt et al. | |
| 2005/0266835 A1 | 12/2005 | Agrawal et al. | |
| 2006/0031510 A1 | 2/2006 | Beck et al. | |
| 2006/0184997 A1* | 8/2006 | La Rotonda | G06Q 10/10 726/2 |
| 2006/0294192 A1* | 12/2006 | Mao | H04L 67/306 709/213 |

OTHER PUBLICATIONS

B. Patel et al., *Ticket Based Service Access for the Mobile User*, Dept. of Computer Science, University College London, 2002, pp. 223-233.

\* cited by examiner

SYSTEM, METHOD, APPARATUS, AND COMPUTER PROGRAM PRODUCT FOR PROVIDING A SOCIAL NETWORK DIAGRAM IN A P2P NETWORK DEVICE

TECHNOLOGICAL FIELD

Embodiments of the present invention relate generally to social network communication technology and, more particularly, relate to a system, method, apparatus and computer program product for providing a social network diagram in a peer-to-peer (P2P) network device.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of information sharing in P2P networks. A P2P network is generally considered a network that relies primarily on the computing power and bandwidth of the devices (i.e., peers) within the network. Accordingly, P2P networks generally do not concentrate computing power and bandwidth within servers. Rather each of the peer devices is capable of simultaneously functioning as both a client and a server to other nodes of the P2P network. The architecture of P2P networks typically involves connecting nodes via largely ad hoc connections over which participant nodes can, for example, share content files containing audio, video, data or virtually anything in a digital format. Accordingly, data such as real time data or telephony traffic could be shared using P2P network.

Given the ubiquitous nature of mobile terminals, such as mobile phones and numerous other mobile electronic devices, P2P networks are becoming more common for sharing content between individuals of social groups or social networks. These social networks may center on a group of friends, relatives, co-workers, business associates, or people who share a common interest. Each individual (i.e., node) within a social network may invite other individuals to join. As such, although any particular node may generally communicate with a given group of other nodes within the social network, each of the other nodes may subsequently communicate with yet other nodes. Accordingly, within a social network, each node may be defined in terms of a degree of separation from each other node. For example, if user A invites user B to view a particular file on user A's device, and user B subsequently invites user C to view the particular file, user B may be considered to have one degree of separation from user A, while user C may be considered to have two degrees of separation from user A. In a large P2P network, it may be possible for an invitation sent to a list including a relatively small number of other nodes to view some content at an originating device to grow into a very large list, which could burden the network. Accordingly, some originating nodes may place limits on the degree of separation a node may have from the originating device in order to gain access to the content.

However, a particular invitation which followed a tortuous flow path (e.g. a large number of degrees of separation) may not be indicative of the true degree of separation between an originating node and a recipient node based on past relationships indicated by previously received invitations. Accordingly, it may be desirable to provide a method of determining the true degree of separation between an originating node and a recipient node.

BRIEF SUMMARY

A method, apparatus and computer program product are therefore provided for providing a social network diagram in a P2P network that may be updated periodically upon receipt of an invitation. Thus, it may be possible to determine a true degree of separation between an originating node and a recipient node trying to access content related to the invitation.

In one exemplary embodiment, a method of providing a social network diagram in a P2P network that may be updated is provided. The method includes receiving, at a recipient node, an access ticket from an originating node, the access ticket for accessing content via a network, and determining a true degree of separation between the originating node and the recipient node based on a delivery route of the access ticket and past delivery routes of past access tickets.

In another exemplary embodiment, a computer program product for providing a social network diagram in a P2P network that may be updated is provided. The computer program product includes at least one computer-readable storage medium having computer-readable program code portions stored therein. The computer-readable program code portions include first and second executable portions. The first executable portion is for receiving, at a recipient node, an access ticket from an originating node, the access ticket for accessing content via a network. The second executable portion is for determining a true degree of separation between the originating node and the recipient node based on a delivery route of the access ticket and past delivery routes of past access tickets.

In another exemplary embodiment, an apparatus for providing a social network diagram in a P2P network that may be updated is provided. The apparatus includes communication element and an updating element. The communication element is configured to receive an access ticket from an originating node, the access ticket for accessing content via a network. The updating element is configured to determine a true degree of separation between the originating node and the apparatus embodied as a recipient node based on a delivery route of the access ticket and past delivery routes of past access tickets.

In another exemplary embodiment, an apparatus for providing a social network diagram in a P2P network that may be updated is provided. The apparatus includes means for receiving, at a recipient node, an access ticket from an originating node, the access ticket for accessing content via a network, and means for determining a true degree of separation between the originating node and the recipient node based on a delivery route of the access ticket and past delivery routes of past access tickets.

Embodiments of the present invention may be employed, for example, in mobile terminals or other nodes in order to provide improved content sharing capabilities between nodes in a P2P network.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 7A:
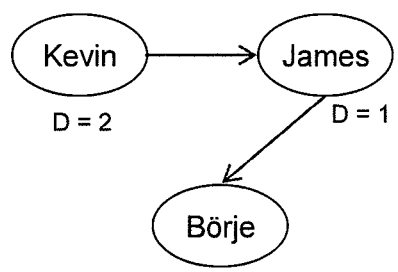
Figure 7B:
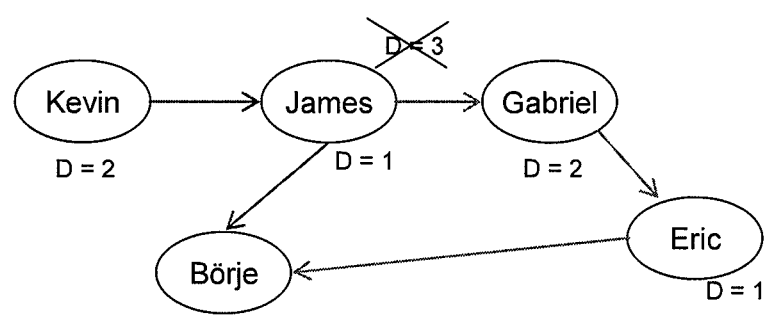
Figure 7C:
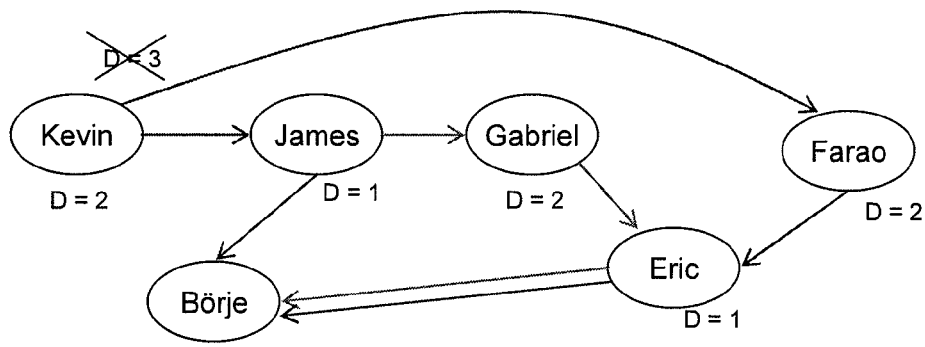
Figure 7D:
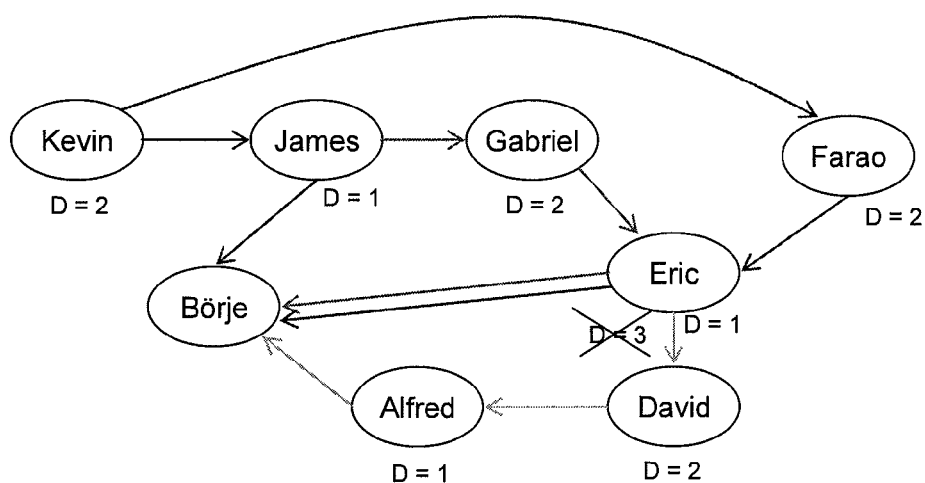
Figure 8:
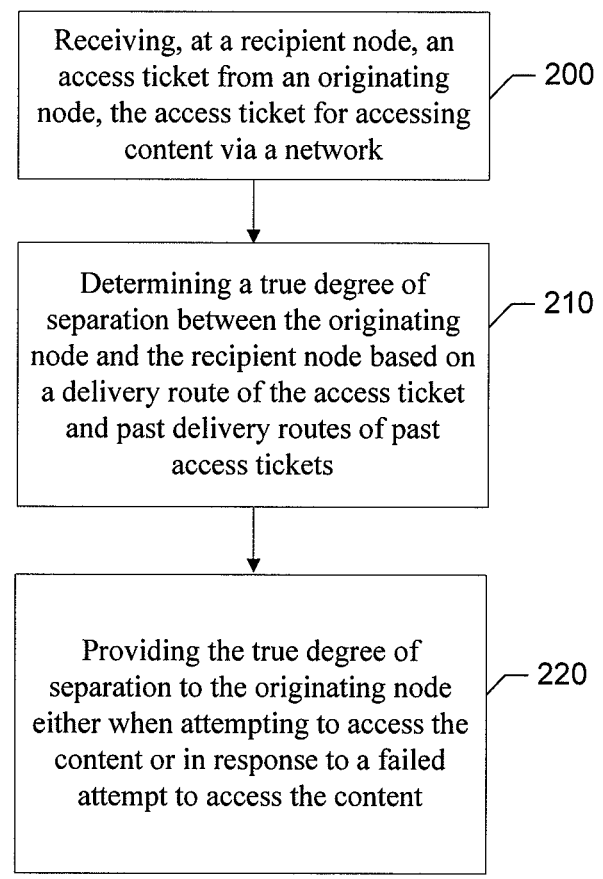

FIGS. 7A to 7&D illustrate a diagram of the updating of the social network diagram according to exemplary embodiments of the invention; and FIG. 8 is a flowchart according to an exemplary method of providing an updatable social network diagram according to one embodiment of the present invention.

DETAILED DESCRIPTION

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
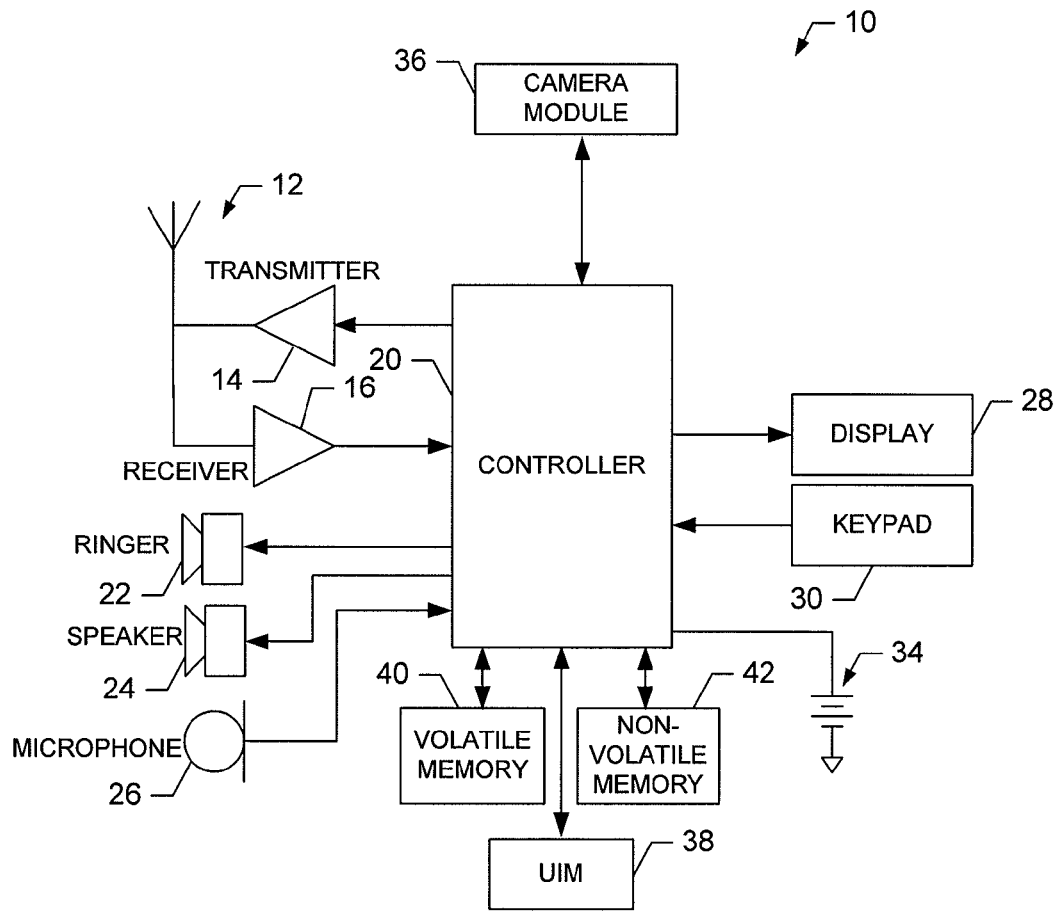
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
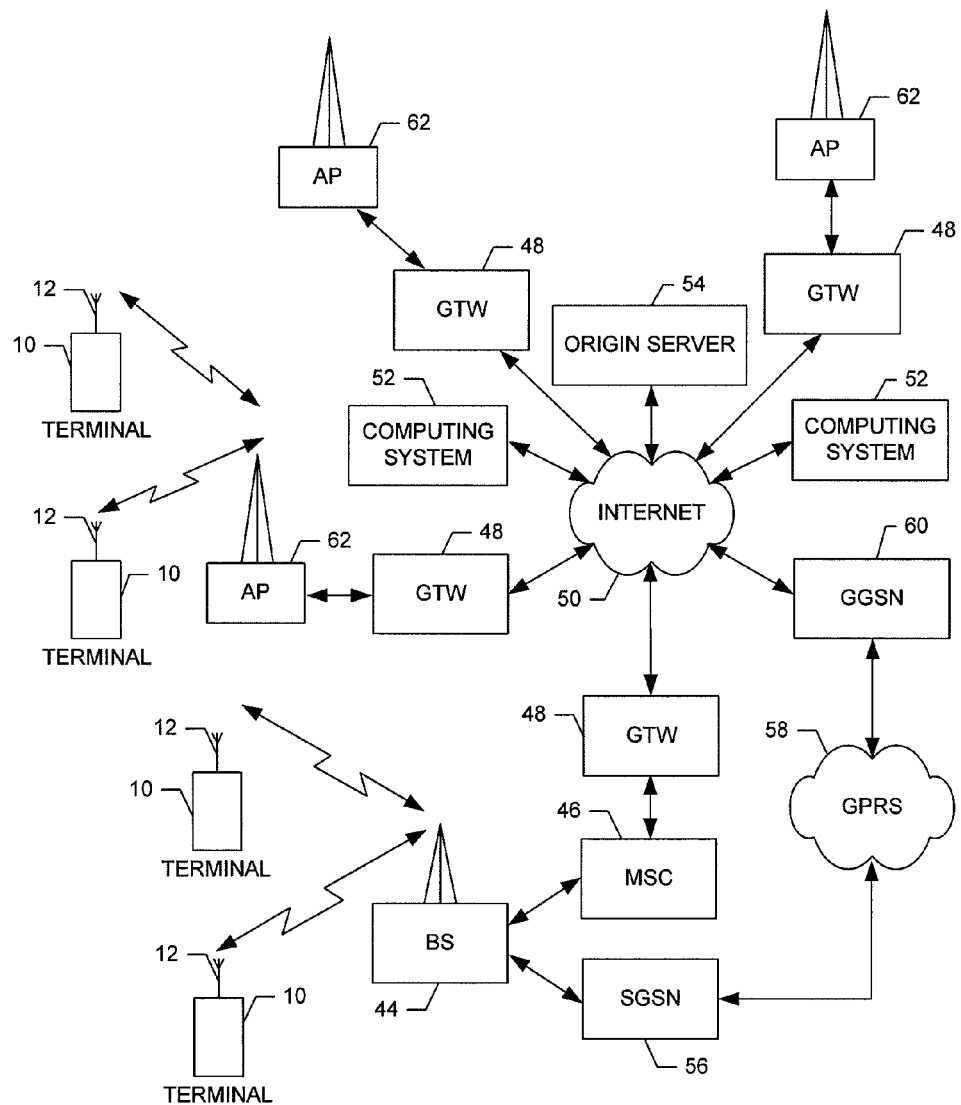
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

As described above, social networks may be formed via ad hoc connections between various nodes, which could be mobile terminals. Such connections may then be utilized to, for example, share access to content which could include video clips, text, audio data, photographs, etc. It should also be understood that accessing content could refer to accessing resources of a particular device. A common way to control access to content has been to provide access control lists (ACLs), which inform a particular device which permissions or access rights each user or group has to specific objects such as files or directories. The access control may be based on the identity of a corresponding user (e.g., username, user ID, etc) or the identity of a device (e.g., device name, media access control (MAC) address, Internet Protocol (IP) address, etc.). By utilizing relationships in social networks, other ways of controlling access to content may be implemented.

In an exemplary embodiment, when a particular node within a social or P2P network wishes to share content with others, the particular node may send an invitation to access the content to other nodes, any of which may be mobile terminals. As such, the particular node becomes an originating node for the corresponding invitation. Each receiver of the invitation may then forward the invitation to still other nodes such that each time a node forwards the invitation another degree of separation ("D") from the particular node is introduced. The invitation may be presented by any of the receivers to the originating node in an effort to obtain access to the content. In an exemplary embodiment, access may only be granted to receivers who have a degree of separation that meets a selected criteria, such as being below a predefined threshold (e.g., D<3 although any threshold for D could be selected). Thus, a recipient node that attempts to utilize the invitation to access the content must present the invitation, which is accompanied by information indicating the degree of separation, to the originating node in order to obtain access so long as the invitation is accompanied by degree of separation information that meets the selected criteria.

Figure 3:
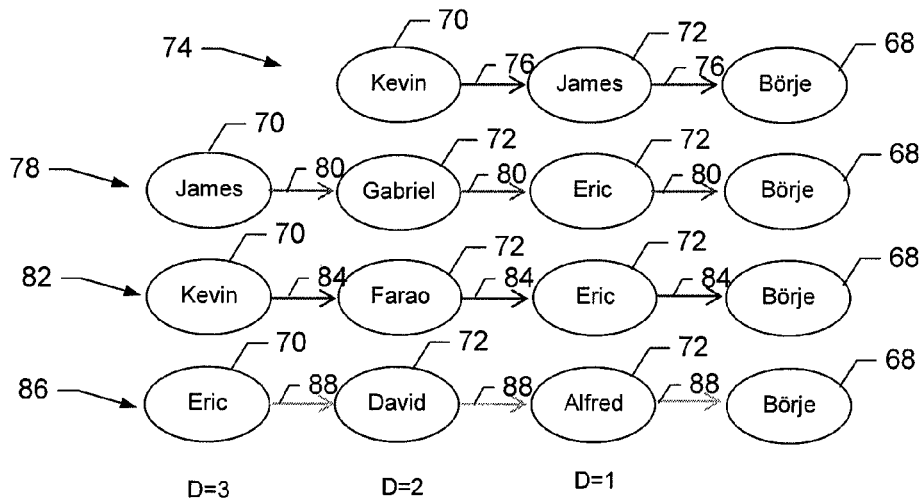
FIG. 3 illustrates a social network diagram according to an exemplary embodiment of the present invention.

FIG. 3 illustrates a social network diagram according to an exemplary embodiment of the present invention. In this regard, FIG. 3 shows delivery routes of four different invitations which are received at a particular node (i.e., Borje), which is the ultimate recipient or recipient node 68 for each of the delivery routes of the invitations shown in FIG. 3. Each of the nodes may be associated with a particular username (e.g., Kevin, James, Eric, etc.). However, it should be understood that each of the nodes may alternatively be associated with or identified by any of the other identity mechanisms known in the art including those described above (i.e., user ID, device name, MAC address, IP address, etc.). Invitations, each of which may include an access ticket and information defining the degree of separation, are communicated between each of the nodes. As such, the node from which the access tickets originate in each illustrated route is an originating node 70. Receivers of the access ticket that are disposed between the originating node 70 and the recipient node 68 may be considered intermediate nodes 72. Although, it should be understood that each intermediate node 72 is itself also a recipient node, the present example will focus on the perspective of Borje as the recipient node 68 of four different access tickets for purposes of explanation. It should also be noted that the terms originating node 70, intermediate node 72 and recipient node 68 are generic terms that denote relative function or position with respect to a particular delivery route of an access ticket from any originating node 70 to any recipient node 68. Thus, it is possible for a particular user such as, for example, Eric to be an originating node in one delivery route or an intermediate or recipient node in another delivery route.

A delivery route could be established by the forwarding of an invitation from an originating node to an intermediate node which may then forward the invitation to other intermediate nodes prior to the invitation reaching the recipient node. The recipient node will then have a degree of separation determined based on the number of intermediate nodes between the originating node and the recipient node. For example, the recipient node may have a degree of separation of N+1, where N is the number of intermediate nodes. Alternatively, an originating node could send invitations to nodes corresponding to a listing of friends (i.e., D=1 contact list) of the originating node such that the invitation may automatically be sent to any D=1 contacts of each of the nodes corresponding to the listing of friends.

In an exemplary embodiment, each node may have the capability of defining an access policy for invitations which originate at the corresponding node. The access policy may be universal in that it applies to every invitation sent from the corresponding node, or the access policy may be individually set for each invitation such as when the invitation is sent. The access policy may define a selected criteria with regard to the degree of separation which a recipient node may have in order to access the content associated with the invitation.

As shown in FIG. 3, in a first delivery route 74, Kevin may send an invitation for James to access some content by sending James a first access ticket 76. James may subsequently forward the first access ticket 76 to Borje. Accordingly, within the first delivery route 74, Kevin is the originating node 70 and James is the intermediate node 72, while Borje is the recipient node 68. Since James forwarded the first access ticket 76 directly to Borje, James may be considered to have one degree of separation from Borje (i.e., D=1). Additionally, since James received the first access ticket 76 directly from Kevin, James has one degree of separation from Kevin. Meanwhile, since the first access ticket 76 was forwarded from Kevin to Borje via James, Borje has a second degree of separation from Kevin (i.e., D=2). In other words, Borje has a D=1 relationship with James and a D=2 relationship with Kevin. Thus, according to the first delivery route 74, the recipient node 68 has a D=2 relationship with the originating node 70. Accordingly, if Kevin, as the originating node 70, has instituted an access policy restricting access to the content associated with the first access ticket 76 for viewing the content to D<3, any recipient node with a D=3 or higher degree of separation will be denied access to the content. In the present case, since Borje has a D=2 relationship with Kevin with regard to the first access ticket 76, if Borje attempts to access the content, access will be granted.

In a second delivery route 78, James may send an invitation for Gabriel to access some content by sending Gabriel a second access ticket 80. Gabriel may subsequently forward the second access ticket 80 to Eric who then forwards the second access ticket 80 to Borje. Accordingly, within the second delivery route 78, James is the originating node 70 and both Gabriel and Eric are intermediate nodes 72, while Borje is the recipient node 68. Since Eric forwarded the second access ticket 80 directly to Borje, Eric may be considered to have one degree of separation from Borje (i.e., D=1). Additionally, since there were two intermediate nodes 72, Borje has three degrees of separation from James (i.e., D=3). In other words, Borje has a D=1 relationship with Eric, a D=2 relationship with Gabriel, and a D=3 relationship with James with respect to the second access ticket 80. Thus, according to the second delivery route 78, the recipient node 68 has a D=3 relationship with the originating node 70. Accordingly, if James, as the originating node 70, has instituted an access policy restricting access to the content associated with the second access ticket 80 for viewing the content to D<3, any recipient node with a D=3 or higher degree of separation will be denied access to the content. In the present case, since Borje has a D=3 relationship with James with regard to the second access ticket 80, if Borje attempts to access the content, access will be denied.

Similarly, with respect to a third delivery route 82 involving a third access ticket 84 and a fourth delivery route 86 involving a fourth access ticket 88, Borje, as the recipient node 68 has a D=3 relationship with each corresponding originating node 70 with respect to both the third and fourth delivery routes 82 and 86. Thus, based only on the delivery routes themselves, Borje would only be able to access the content associated with the first access ticket 76 since Borje only has a close enough relationship to the originating node to access the content (i.e., D=2) in connection with the first delivery route 74.

An access ticket may include an identification of a location of the content for which the access ticket may enable access. For example, the access ticket may include a universal resource indicator (URI) for a location of the content. The location could be within the originating node 70 or within another device such as, for example, a server associated with the originating node 70. As stated above, the degree of separation information may be communicated along with the access ticket. In an exemplary embodiment, each node which receives the access ticket may add a personal tag or piece of user information to the access ticket. Accordingly, each personal tag would represent another degree of separation. Thus, for example, with respect to the first delivery route 74, when James receives the first access ticket 76 a personal tag or piece of user information associated with James may be added to the first access ticket 76. When Borje receives the first access ticket 76, a personal tag or piece of user information associated with Borje may be added to the first access ticket 76. Accordingly, when Borje, as the recipient node 68, attempts to access the content corresponding to the first access ticket (e.g., the content whose location is indicated in a URI within the access ticket), Borje must present the first access ticket 76 to the originating node 70 (i.e., Kevin) which indicates that two personal tags (i.e., Borje and James) have been added to the first access ticket 76 so that D=2. In other words, the degree of separation is equal to the number of personal tags added to an access ticket when the access ticket is presented to the originating node in an effort to achieve access to the content associated with the access ticket. Thus, the originating node 70 (i.e., Kevin), can determine that the recipient node 68 (i.e., Borje) has a D=2 relationship to the originating node 70.

Figure 4:
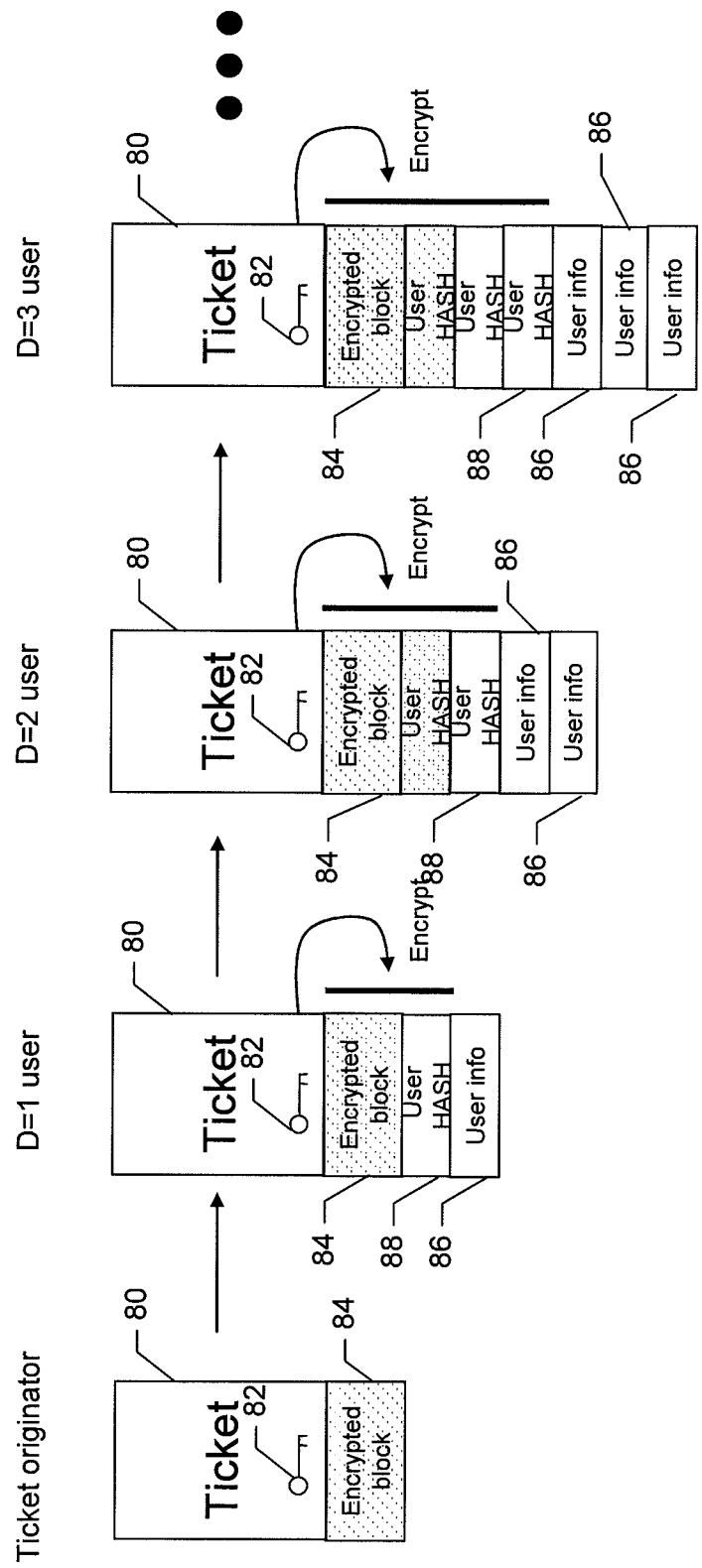
FIG. 4 illustrates a security function employed in connection with an access ticket according to an exemplary embodiment of the present invention.

Normally the personal information (i.e., personal tag or piece of user information) associated with an access ticket is visible to each recipient of the access ticket. In some situations, there could be a concern that it may be possible for a recipient node to attempt to modify an access ticket to, for example, delete one or more personal tags in order to make the recipient node appear to have a closer relationship to an originating node so that content may be accessed by an unauthorized and distantly related node. For example, in the case of the fourth delivery route 86, Borje may attempt to delete the personal tag associated with David in order to make it appear as though Borje has a D=2 rather than a D=3 relationship with Eric with respect to the fourth delivery route 86. In order to prevent such actions, a security function may be employed, as shown in FIG. 4.

An exemplary embodiment in which a security function is performed on the access ticket will now be described in reference to FIG. 4. In this regard, an access ticket 80, which includes service information such as the location of associated content, may also include a public key 82 for encryption and an encrypted block 84. In an exemplary embodiment, the encrypted block 84 may include access ticket integrity information and/or a security identifier that is encrypted with the public key 82. As such the access ticket 80 may be transmitted from a ticket originator (i.e., originating node) and be received at a D=1 user where a personal tag or user information 86 is added to the access ticket 80. Receipt of the access ticket 80 may then cause the device of the D=1 user to calculate a user hash 88 including a hash of the entire access ticket (i.e., the access ticket 80 received and the added user information 86). The user hash 88 is then encrypted with the public key 82 along with the encrypted block 84 prior to communication of the access ticket to another user. At each subsequent node, the subsequent node adds corresponding user information and a new user hash is calculated and then encrypted using the public key 82 along with previous encrypted portions prior to communication of the access ticket to another user. The user information 86 associated with each user may still be visible to each subsequent user; however, the contents of the encrypted block cannot be seen by anyone other than the originating node which may view such contents by use of the public key 82 for decryption. Accordingly, when a recipient node attempts to access the content associated with the access ticket 80, the originating node may decrypt the contents of the encrypted block 84 and each of the user hashes 88 that have been encrypted in order to verify the integrity of the delivery route indicated. For example, each of the user hashes 88 must correlate to respective hashes of each corresponding user information 86 accompanying the access ticket. As such, the originating node may decrypt each of the encrypted blocks and then hash the corresponding user information for comparison purposes one by one in order to ensure such correspondence.

As stated in the example above, based only on the delivery routes themselves, Borje would only be able to access the content associated with the first access ticket 76 since Borje only has a close enough relationship to the originating node to access the content (i.e., D=2) in connection with the first delivery route 74. Thus, Borje would not be able to access content associated with the second, third and fourth delivery routes 78, 82 and 86 since, for each of the corresponding delivery routes alone, Borje is a D=3 user with respect to the originating node. However, based on the social network diagram of FIG. 3, it can be seen that Borje has three D=1 friends, namely Eric, James and Alfred. Despite this fact, in the context of the fourth delivery route 86 alone, it appears to the contrary that Borje (the recipient node 68) is separated from Eric (the originating node 70) by three degrees of separation. Thus, despite Borje and Eric having a close (D=1) relationship, Borje is unable to access the content associated with the fourth access ticket 88 under normal circumstances in which the fourth delivery route 86 corresponding to the fourth access ticket 88 is referenced in isolation to determine the degree of separation between the originating node 70 and the recipient node 68. However, if Borje's node were capable of storing data regarding each delivery route in a social network diagram which could be updated with the receipt of each access ticket, and thereafter utilized to determine a "true degree of separation" from Borje to the originating node of the access ticket, Borje could possibly access content from a closely related party or friend (e.g., D<3) despite the fact that the particular invitation corresponding to the content passed through a number of intermediate nodes before it reached Borje.

Figure 5:
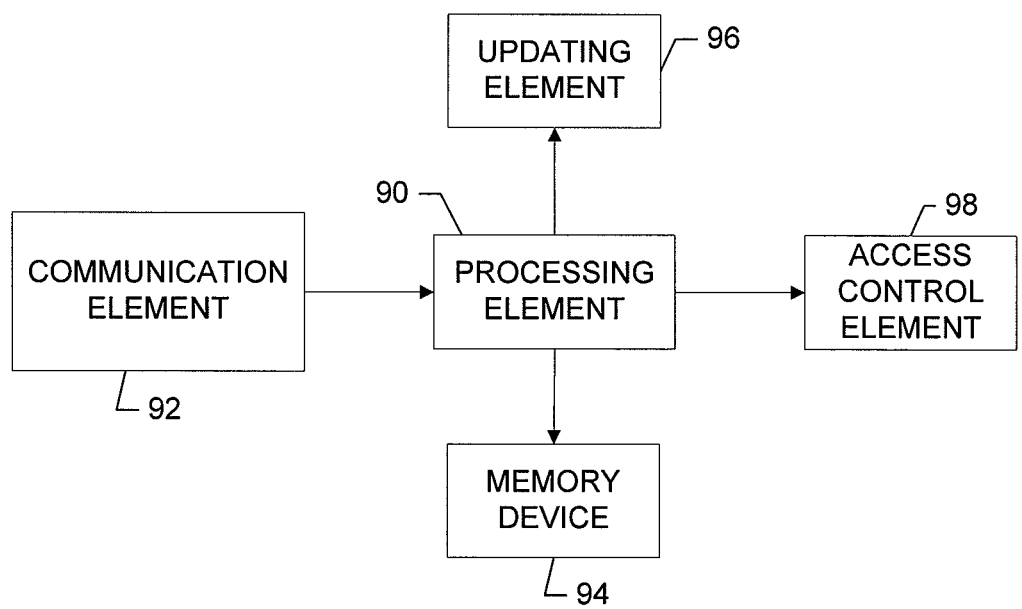
FIG. 5 illustrates a functional block diagram of a node according to an exemplary embodiment of the present invention.

Accordingly, an exemplary embodiment of the present invention will now be described with reference to FIG. 5 which illustrates a node configured to provide an updatable social network diagram for determining a true degree of separation between nodes of the social network in accordance with an exemplary embodiment of the present invention. The node, which could be embodied as the mobile terminal 10 of FIG. 1, may include a processing element 90, a communication element 92, a memory device 94, an updating element 96, and an access control element 98. It should be noted that the node described below with reference to FIG. 5 is merely one example of an arrangement for a node that is capable of practicing embodiments of the present invention and other arrangements are also possible.

Processing elements described herein (e.g., controller 20 and processing element 90) may be embodied in many ways. For example, the processing elements may be embodied as a processor, a coprocessor, a controller or various other processing means or devices including integrated circuits such as, for example, an ASIC (application specific integrated circuit). In an exemplary embodiment, the processing element 90 may be configured to execute instructions stored in the memory device 94 or otherwise accessible to the processing element 90 in order to execute applications or perform functions defined by the instructions. The processing element 90 may also control the operations of other functional elements described herein. The memory device 94 may include volatile and/or non-volatile memory and may buffer data temporarily or provide long term data storage for the node. In an exemplary embodiment, the memory device 94 may store an updatable social network diagram as described in greater detail below.

The communication element 92 may be embodied as any device or means embodied in either hardware, software, or a combination of hardware and software that is capable of receiving and/or transmitting data of any kind at or from the node. As such, the communication element 92 may include hardware and/or software for receiving transmissions that may include access tickets and corresponding information from other nodes and for transmitting access tickets and corresponding information to other nodes.

The updating element 96 may be embodied as any device or means embodied in either hardware, software, or a combination of hardware and software that is capable of monitoring the communication element 92 for receipt of incoming access tickets and thereafter signaling the processing element 90 to update the updatable social network diagram stored in the memory device 94. Alternatively, the updating element 96 may directly communicate with the memory device 94 to update the updatable social network diagram. In an exemplary embodiment, in response to receipt of an access ticket, the updating element 96 may access the updatable social network diagram and compare relationships between all nodes of the social network as they are currently defined in the updatable social network diagram to relationships defined by the delivery route of the received access ticket. If the received access ticket indicates that changes should be made to the updatable social network diagram such as by including a new relationship or defining an existing relationship in a manner that includes fewer degrees of separation, the updating element 96 may update the updatable social network diagram to reflect the changes. For example, if a message is received indicating that a particular node has a D=1 relationship with the receiving node, but the receiving node had previously received a message with a D=3 relationship between the particular node and the receiving node, then the social network diagram may be updated to indicate the closer relationship (i.e., D=1) as being definitive of the relationship between the particular node and the receiving node. If, on the other hand, the received access ticket does not define any new relationships or define an existing relationship in a manner that includes fewer degrees of separation, then the updatable social network diagram may be left unchanged. After changing or updating the updatable social network diagram, the updated social network diagram may be stored in the memory device 94.

The access control element 98 may be embodied as any device or means embodied in either hardware, software, or a combination of hardware and software that is capable of defining access policy for an access ticket originated at the node (i.e., when the node is an originating node), processing incoming access tickets with respect to user information or security functions (i.e., when the node is an intermediate or recipient node), and/or checking access rights of recipient nodes (i.e., when the node is an originating node).

In an exemplary embodiment the access control element 98 may be embodied as software operating, for example, on the mobile terminal 10 of FIG. 1. Thus, for example, when defining access policy, the access control element 98 may receive a user input regarding access policy. In this regard, the access policy may define which other users or nodes within a social network may access content or device resources associated with the node. Thus, for example, the access control element 98 may define an acceptable degree of separation which a recipient node presenting an access ticket may possess in order to gain access to content associated with the access ticket. For example, the access control element 98 may be utilized such that, in order to access content related to an access ticket sent by the node (i.e., when the node is an originating node), a recipient node must have a degree of separation below a certain threshold (e.g., D<3).

When processing incoming access tickets with respect to user information or security functions, the access control element 98 may receive an incoming access ticket from the communication element 92 and add a personal tag or user information corresponding to the node (which may be acting as an intermediate node or a recipient node) to the access ticket. In embodiments in which a security function is employed with respect to the user information, the access control element 98 may be further configured to perform the user hash and encrypt data using the public key supplied with the access ticket by the originating node.

When checking access rights of recipient nodes, the access control element 98 may receive the access ticket from a recipient node and determine if the recipient node is authorized to receive access to the content associated with the access ticket based on the access policy. For example, the access control element 98 may determine, based on the information accompanying the access ticket (i.e., user information or personal tag) whether the degree of separation of the recipient node from the originating node is below any threshold specified in the access policy. The access control element 98 may also determine, if applicable, whether the delivery route is authentic (e.g., by checking encrypted data and/or user hash data using the public key for decryption). If the degree of separation is below the threshold (and, if applicable, the delivery route is authentic), the recipient node may receive access to the content. However, if the degree of separation is above the threshold (or the delivery route is not authentic), the recipient node may be denied access to the content.

Figure 6:
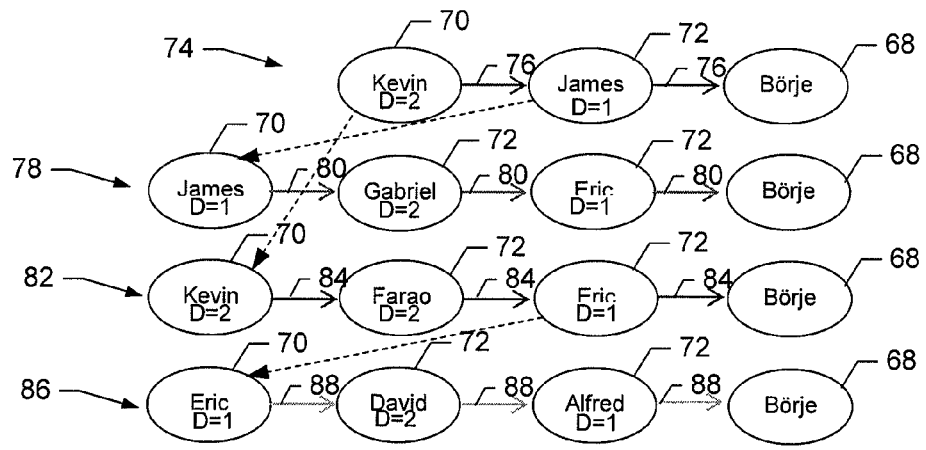
FIG. 6 illustrates a social network diagram that is updated according to an exemplary embodiment of the present invention.

According to an exemplary embodiment, the access control element 98 may refer to the updated social network diagram stored in the memory device 94 in order to determine the true degree of separation, rather than relying merely on the degree of separation as it appears in any given delivery route. FIG. 6 shows an example of an updated social network diagram according to an exemplary embodiment of the present invention. As can easily be seen, FIG. 6 includes the same delivery routes which were illustrated in FIG. 3, except that FIG. 6 illustrates also the true degree of separation for each of the corresponding usernames based on the totality of the social network diagram. Thus, for example, after receiving each of the first, second, third and fourth access tickets 76, 80, 84 and 88 corresponding to the first, second, third and fourth delivery routes 74, 78, 82 and 86, respectively, the updating element 96 may determine a true degree of separation for each username based on the closest relationships revealed by the combination of the delivery routes. For example, James, Eric and Alfred all have a D=1 relationship with Borje. Accordingly, whereas the fourth delivery route 86 viewed in isolation would appear to indicate that Eric has a D=3 relationship with Borje, the fourth delivery route 86 can be updated to indicate instead that Eric and Borje have a D=1 relationship based on the second and third delivery routes 78 and 82. Additionally, although James would appear to have a D=3 relationship with Borje based only on the second delivery route 78, when considered in combination with the first delivery route 74, it is clear that James has a D=1 relationship with Borje and thus, the updatable social network diagram is modified to reflect the true degree of separation between James and Borje. Likewise, Kevin's apparent relationship based only on the third delivery route 82 may be updated to reflect the relationship indicated by the first delivery route 74. Basically, during operation, each time a new access ticket is received, the relationship between each node in the social network is updated to reflect the closest relationship exhibited in either the current delivery route or the delivery route of any previously received access ticket.

FIG. 7 shows the process described above as it may occur in iterative fashion according to an exemplary embodiment of the present invention. In this regard, FIG. 7A illustrates the updatable social network diagram as it may appear based only on the first delivery route 74. FIG. 7B illustrates the updated social network diagram based on the receipt of the second access ticket 80 via the second delivery route 78. As can be seen in FIG. 7B, the degree of separation associated with James is updated to reflect the closest relationship exhibited in the combination of the first and second delivery routes 74 and 78. FIG. 7C illustrates the updated social network diagram based on the receipt of the third access ticket 84 via the third delivery route 82. As can be seen in FIG. 7C, the degree of separation associated with Kevin is updated to reflect the closest relationship exhibited in the combination of the first, second and third delivery routes 74, 78 and 82. FIG. 7D illustrates the updated social network diagram based on the receipt of the fourth access ticket 88 via the fourth delivery route 82. As can be seen in FIG. 7D, the degree of separation associated with Eric is updated to reflect the closest relationship (i.e., lowest D) exhibited in the combination of the first, second, third and fourth delivery routes 74, 78, 82 and 86. Thus, as can be seen from FIGS. 5 and 7, Borje has a true degree of separation of D<3 for each of the first, second, third and fourth access tickets 76, 80, 84 and 88 and thus, contrary to the result described in reference to FIG. 3, Borje may be enabled to access the content associated with each of the respective access tickets.

It should be noted that although Borje's updated social network diagram indicates that Borje has a true degree of separation below the threshold for receiving access to content associated with the respective access tickets, it is actually the social network diagram of the originating node 70 in regard to each access ticket which determines whether Borje as the recipient device 68 may access the content. As such, although in many networks it is assumed that the flow of traffic through the network will be such that most nodes will have a similar updated social network diagram, it may be desirable to incorporate a reconciliation function in association with the access control element 98 of each node. Thus, for example, with regard to the third delivery route 82, assume for the purposes of example that the node associated with Kevin has a social diagram which does not indicate that Borje has a D=2 relationship with respect to Kevin. Accordingly, when Borje attempts to access the content associated with the third access ticket 84, Kevin would normally deny access to Borje since Kevin's social diagram may, for example, indicate that Borje is a D=3 recipient node. However, according to exemplary embodiments of the present invention, nodes associated with Kevin and Borje, respectively, may reconcile the difference between the indicated degree of separation between Kevin and Borje.

In one exemplary embodiment, the access control element 98 of the recipient node 68 (i.e., Borje) may also be configured to indicate the true degree of separation along with the access ticket so that the originating node 70 (i.e., Kevin) may compare the indicated true degree of separation provided by the recipient node 68 to the true degree of separation indicated by the social network diagram of the originating node 70. If the comparison fails to match, a reconciliation of social diagrams may be triggered. For example, upon failing to achieve a match as a result of the comparison, the originating node 70 may send a reconciliation signal to the recipient node 68 requesting a data exchange with the recipient node 68 to reconcile the difference. Alternatively, the access control element 98 of the originating node 70 may be configured to request reconciliation, for example, by sending a reconciliation signal to the recipient node 68 in response to a failure of the degree of separation between the originating and recipient nodes as indicated at the originating node 70 to be below the threshold for receiving access. As yet another alternative, in response to a failure to receive access to the content despite presenting a true degree of separation that is below the threshold for receiving access to content associated with a respective access ticket, the recipient node 68 may send a reconciliation signal to the originating node 70 to initiate a reconciliation of social network diagrams between the nodes.

FIG. 8 is a flowchart of a system, methods and program products according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing an updatable social network diagram, as shown in FIG. 9, may include receiving, at a recipient node, an access ticket from an originating node, the access ticket for accessing content via a network at operation 200. At operation 210, a true degree of separation between the originating node and the recipient node may be determined based on a delivery route of the access ticket and past delivery routes of past access tickets. Although not required, the true degree of separation may be provided to the originating node either when attempting to access the content or in response to a failed attempt to access the content at operation 220. In an exemplary embodiment, operation 210 may include storing the delivery route and comparing the delivery route to the past delivery routes to determine a closest relationship between the originating node and the recipient node based on all of the delivery routes. Alternatively, operation 210 could include determining the true degree of separation from an updated social diagram that is stored at the recipient node and updated each time a new access ticket is received. In an exemplary embodiment, the updated social diagram may be reconciled with a social diagram of the originating node. Additionally, a security function may be performed on the access ticket. In this regard, the access ticket may include a public key, a location of content associated with the access ticket, and an encrypted block that was encrypted using the public key. As such the security function may be performed by performing a hash of the access ticket, the encrypted block and each user information segment associated with the access ticket and thereafter encrypting the hash using the public key.

Although the updating functionality described above is performed at the recipient node, it is also possible that such functionality may be performed at another device in communication with the recipient node (e.g., a server). As such, incorporating the updating functionality into the recipient node is but one example of how embodiments of the present invention may be performed.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    receiving, at a communication element of a recipient node, an access ticket originating from an originating node, the access ticket for accessing content via a network and providing an identifier of the content, wherein the access ticket includes at least a public key;
    determining, at an updating element of the recipient node, a true degree of separation between the recipient node and the originating node based on a comparison of a current delivery route of the access ticket and a social diagram stored in memory device of the recipient node that reflects degrees of separation between the recipient node and other nodes based on past delivery routes of the recipient node, a true degree of separation being a smallest degree of separation between two nodes;
    when the current delivery route indicates an intermediate node between the recipient node and the originating node, determining, at the updating element, a true degree of separation between the recipient node and the intermediate node based on the comparison of the current delivery route of the access ticket and the stored social diagram, wherein each of the originating node, the recipient node, and the intermediate node comprises a peer node in a peer-to-peer network; and
    determining, by an access control element of the recipient node, to access the content via the network when the true degree of separation between the recipient node and the originating node is less than a predetermined threshold.

2. A method according to claim 1, further comprising determining, by the access control element, to provide the true degree of separation between the recipient node and the originating node to the originating node when attempting to access the content.

3. A method according to claim 1, further comprising determining, by the access control element, to provide the true degree of separation between the recipient node and the originating node to the originating node in response to a failed attempt to access the content.

4. A method according to claim 1, further comprising:
    updating, the by updating element, the stored social diagram with the true degree of separation between the recipient node and the originating node each time a new access ticket is received; and
    when the current delivery route indicates an intermediate node between the recipient node and the originating node, updating, the by updating element, the stored social diagram with the true degree of separation between the recipient node and the intermediate node each time a new access ticket is received.

5. A method according to claim 4, further comprising determining to reconcile the updated social diagram with a social diagram of the originating node.

6. A method according to claim 1, further comprising: determining to perform a security function on the access ticket.

7. A method according to claim 6, wherein receiving the access ticket comprises receiving the access ticket which includes a public key, a location of content associated with the access ticket, and an encrypted block that was encrypted using the public key.

8. A method according to claim 6, wherein determining to perform the security function on the access ticket comprises determining to perform a hash of the access ticket, the encrypted block and each user information segment associated with the access ticket and thereafter encrypting the hash using the public key.

9. A non-transitory computer-readable storage medium storing instructions, when executed on a processor, cause an apparatus to perform at least the steps of:
    receiving, at a recipient node, an access ticket originating from an originating node, the access ticket for accessing content via a network and providing an identifier of the content, wherein the access ticket includes at least a public key;
    determining a true degree of separation between the recipient node and the originating node based on a comparison of a current delivery route of the access ticket and a social diagram stored on the recipient node, a true degree of separation being a smallest degree of separation between two nodes;
    when the current delivery route indicates an intermediate node between the recipient node and the originating node, determining a true degree of separation between the recipient node and the intermediate node based on the comparison of the current delivery route of the access ticket and the stored social diagram, wherein each of the originating node, the recipient node, and the intermediate node comprises a peer node in a peer-to-peer network; and
    accessing the content via the network when the true degree of separation between the recipient node and the originating node is less than a predetermined threshold.

10. A non-transitory computer-readable storage medium according to claim 9, wherein the apparatus is caused to further perform the step of determining to provide the true degree of separation between the recipient node and the originating node to the originating node when attempting to access the content.

11. A non-transitory computer-readable storage medium according to claim 9, wherein the apparatus is caused to further perform the step of determining to provide the true degree of separation between the recipient node and the originating node to the originating node in response to a failed attempt to access the content.

12. A non-transitory computer-readable storage medium according to claim 9, wherein the apparatus is caused to further perform the steps of:
    updating the stored social diagram with the true degree of separation between the recipient node and the originating node each time a new access ticket is received; and when the current delivery route indicates an intermediate node between the recipient node and the originating node, updating the stored social diagram with the true degree of separation between the recipient node and the intermediate node each time a new access ticket is received.

13. A non-transitory computer-readable storage medium according to claim 12, wherein the apparatus is caused to further perform the step of determining to reconcile the updated social diagram with a social diagram of the originating node.

14. A non-transitory computer-readable storage medium according to claim 9, wherein the apparatus is caused to further perform the step of determining to perform a security function on the access ticket.

15. A non-transitory computer-readable storage medium according to claim 14, wherein the apparatus is caused to further perform the step of receiving the access ticket which includes a public key, a location of content associated with the access ticket, and an encrypted block that was encrypted using the public key.

16. A non-transitory computer-readable storage medium according to claim 14, wherein the wherein the apparatus is caused to further perform the step of determining to perform a hash of the access ticket, the encrypted block and each user information segment associated with the access ticket and thereafter encrypting the hash using the public key.

17. An apparatus comprising:
a processor; and
a memory storing computer program code, the at least one memory and the computer program code configured to, with the at least one processor, cause the apparatus to perform at least the steps of:
receiving an access ticket originating from an originating node, the access ticket for accessing content via a network and providing an identifier of the content, wherein the access ticket includes at least a public key;
determining a true degree of separation between the apparatus embodied as a recipient node and the originating node based on a comparison of a current delivery route of the access ticket and a stored social diagram that reflects degrees of separation between the recipient node and other nodes based on past delivery routes of the recipient node, a true degree of separation being a smallest degree of separation between two nodes;
when the current delivery route indicates an intermediate node between the recipient node and the originating node, determining a true degree of separation between the recipient node and the intermediate node based on the comparison of the current delivery route of the access ticket and the stored social diagram, wherein each of the originating node, the recipient node, and the intermediate node is a peer node in a peer-to-peer network; and
accessing the content via the network when the true degree of separation between the recipient node and the originating node is less than a predetermined threshold.

18. An apparatus according to claim 17, wherein the apparatus is further caused to determine to provide the true degree of separation between the recipient node and the originating node to the originating node when attempting to access the content.

19. An apparatus according to claim 17, wherein the apparatus is further caused to determine to provide the true degree of separation between the recipient node and the originating node to the originating node in response to a failed attempt to access the content.

20. An apparatus according to claim 17, wherein the apparatus is further caused to:
update the stored social diagram with the true degree of separation between the recipient node and the originating node each time a new access ticket is received; and
when the current delivery route indicates an intermediate node between the recipient node and the originating node, update the stored social diagram with the true degree of separation between the recipient node and the intermediate node each time a new access ticket is received.

21. An apparatus according to claim 20, wherein the apparatus is further caused to determine to reconcile the updated social diagram with a social diagram of the originating node.

22. An apparatus according to claim 21, wherein the apparatus is further caused to determine to perform a security function on the access ticket.

23. An apparatus according to claim 22, wherein the access ticket includes a public key, a location of content associated with the access ticket, and an encrypted block that was encrypted using the public key.

24. An apparatus according to claim 22, wherein the apparatus is further caused to determine to perform a hash of the access ticket, the encrypted block and each user information segment associated with the access ticket, and wherein the access control element is configured to thereafter encrypt the hash using the public key.

25. An apparatus according to claim 17, wherein the apparatus is embodied in a mobile terminal.

26. An apparatus comprising:
means for receiving, at a recipient node, an access ticket originating from an originating node, the access ticket for accessing content via a network and providing an identifier of the content, wherein the access ticket includes at least a public key; and
means for determining a true degree of separation between the recipient node and the originating node based on a comparison of a current delivery route of the access ticket and a stored social diagram that reflects degrees of separation between the recipient node and other nodes based on past delivery routes of the recipient node, a true degree of separation being a smallest degree of separation between two nodes;
when the current delivery route indicates an intermediate node between the recipient node and the originating node, determining a true degree of separation between the recipient node and the intermediate node based on the comparison of the current delivery route of the access ticket and the stored social diagram, wherein each of the originating node, the recipient node, and the intermediate node comprises a peer node in a peer-to-Deer network; and
means for accessing the content via the network when the true degree of separation between the recipient node and the originating node is less than a predetermined threshold.

27. A system comprising an originating node and a recipient node in communication with each other via a peer-to-peer network, the recipient node comprising a processor and a memory storing executable instructions that, in response to execution by the processor, cause the recipient node to:
receive an access ticket originating from the originating node, the access ticket for accessing content via the network and providing an identifier of the content, wherein the access ticket includes at least a public key;

determine a true degree of separation between the recipient node and the originating node based on a comparison of a current delivery route of the access ticket a stored social diagram that reflects degrees of separation between the recipient node and other nodes based on past delivery routes of the recipient node, a true degree of separation being a smallest degree of separation between two nodes;

when the current delivery route indicates an intermediate node between the recipient node and the originating node, determine a true degree of separation between the recipient node and the intermediate node based on the comparison of the current delivery route of the access ticket and the stored social diagram, wherein each of the originating node, the recipient node, and the intermediate node comprises a peer node in a peer-to-peer network; and access the content via the network when the true degree of separation between the recipient node and the originating node is less than a predetermined threshold.

28. A system according to claim 27, wherein the memory stores instructions for causing the recipient node to:

provide the true degree of separation between the recipient node and the originating node to the originating node when attempting to access the content.

29. A system according to claim 27, wherein the memory stores instructions for causing the recipient node to:

update the stored social diagram with the true degree of separation between the recipient node and the originating node each time a new access ticket is received; and when the current delivery route indicates an intermediate node between the recipient node and the originating node, update the stored social diagram with the true degree of separation between the recipient node and the intermediate node each time a new access ticket is received.

30. A system according to claim 29, further comprising instructions for causing the recipient node to reconcile the updated social diagram with a social diagram of the originating node.

31. A system according to claim 30, wherein the memory stores instructions for causing the recipient node to perform a security function on the access ticket.

* * * * *